PROCESS FOR THE SEPARATION OF ACETYLENE FROM PYROLYSIS GAS

United States Patent Office 3,647,843
Patented Mar. 7, 1972

3,647,843
ACETYLENE-CUPROUS ALUMINUM TETRACHLO-
RIDE COMPLEX AND A PROCESS FOR ITS
PRODUCTION
David G. Walker, Baytown, and Donald A. Keyworth,
Houston, Tex., assignors to Tenneco Chemicals, Inc.
Filed Nov. 20, 1969, Ser. No. 878,356
Int. Cl. C07f 1/08
U.S. Cl. 260—438.1       8 Claims

ABSTRACT OF THE DISCLOSURE

Acetylene reacts with cuprous aluminum tetrachloride under ambient conditions to form a stable complex that is soluble in aromatic hydrocarbons. Since acetylene can be readily recovered from them, solutions containing the acetylene-cuprous aluminum tetrachloride are useful as a storage, transport, or reaction medium for acetylene.

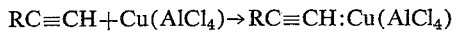

Figure 1:
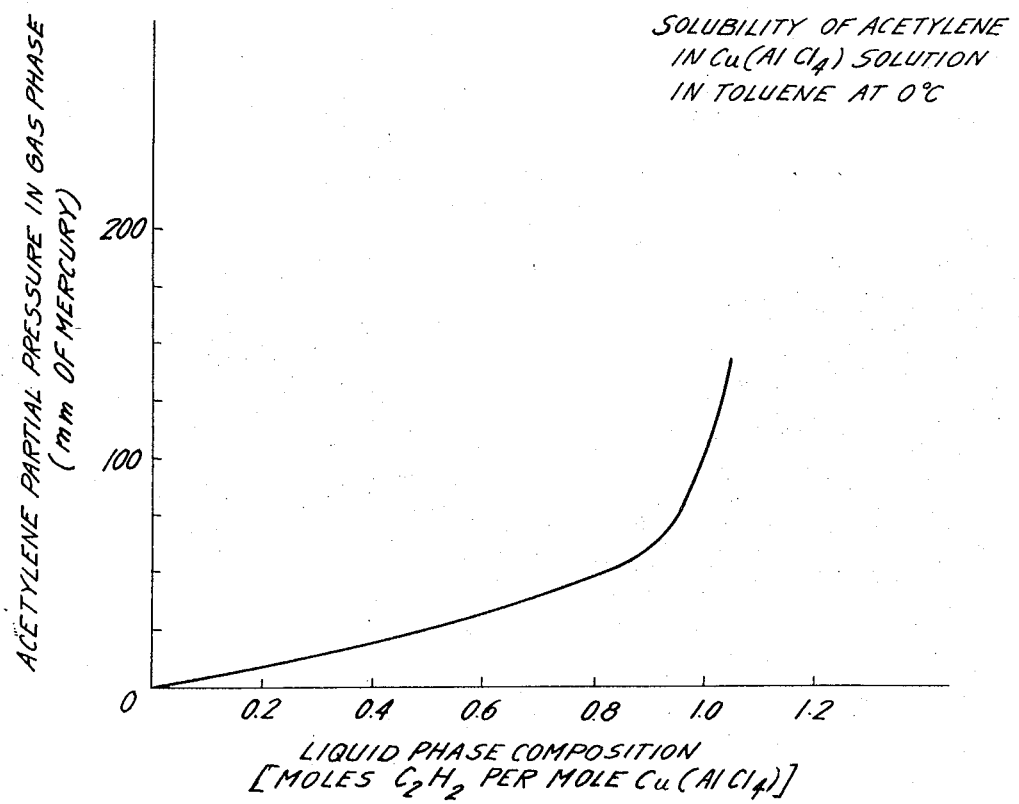

This invention relates to cuprous aluminum tetrachloride complexes with acetylene and other acetylenic compounds and to a process for their preparation. It further relates to the use of solutions of these complexes as a storage, transport, or reaction medium for the acetylenic compound.

Many efforts have been made in recent years to produce substantially pure acetylene. Among the processes used are electric arc pyrolysis of carbon and hydrogen and the partial oxidation of hydrocarbons. In each case the resulting gas mixture contains about 7 to 10 mole percent of acetylene and considerable amounts of difficulty removable impurities. The cost of the concentration and purification steps that are required to separate acetylene from the mixture of gases is ordinarily greater than the raw materials cost and the cost of carrying out the oxidation or pyrolysis reaction.

It has been recognized that the chemical reaction of acetylene with a reagent to form a relatively unstable chemical compound followed by the isolation and decomposition of the acetylene-containing compound would provide an economical and convenient means of recovering acetylene from the mixtures of gases resulting from the oxidation of natural gas or the pyrolysis of carbon and hydrogen. Until the present time, such a recovery process could not be employed because no chemical reagent was known that would react with acetylene to form such a chemical compound or complex.

In accordance with this invention, it has been found that acetylenic compounds react with cuprous aluminum tetrachloride under ambient conditions to form complexes that contain equivalent quantities of the acetylenic compound, cuprous chloride, and aluminum chloride. This reaction may be represented by the following equation:

$$RC\equiv CH + Cu(AlCl_4) \rightarrow RC\equiv CH:Cu(AlCl_4)$$

wherein R represents hydrogen, vinyl, ethynyl, or an alkyl group having from 1 to 10 carbon atoms. The reaction product is believed to be a π-complex that has the structural formula

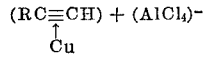

These complexes are stable at room temperature with a small acetylene gas pressure; at higher temperatures they decompose quantitatively to yield the acetylenic compound and cuprous aluminum tetrachloride. The complexes are soluble in benzene, toluene, xylenes, and other aromatic hydrocarbons.

The complexes may be prepared by any suitable and convenient procedure. For example, they may be prepared by contacting an acetylenic compound with a solution that contains about 25 percent to 70 percent by weight of cuprous aluminum tetrachloride in an aromatic hydrocarbon. At 25° C. at a partial pressure of acetylene of 200 mm. Hg, the resulting solution contains about 28 percent to 75 percent by weight of the acetylene-cuprous aluminum tetrachloride complex. Particularly advantageous results are obtained when the solution with which the acetylenic compound is contacted contains about 60 percent to 70 percent by weight of cuprous aluminum tetrachloride in toluene. When an acetylene-containing gas is contacted with such a solution, there is obtained a solution that contains about 65 percent to 75 percent by weight of the acetylene-cuprous aluminum tetrachloride complex in toluene. This solution contains about 5 percent to 10 percent by weight of acetylene or about 2 moles to 4 moles of acetylene per liter of liquid.

The solubility of acetylene at 0° C. in a solution that contains 22 mole percent of cuprous aluminum tetrachloride and 78 mole percent of toluene is shown in FIG. 1.

The reaction between an acetylenic compound and the cuprous aluminum tetrachloride complex is usually carried out at temperatures in the range of about −10° C. to 40° C. and at gas pressures in the range of about 1 to 3 atmospheres. Gas mixtures that contain as little as 2 mole percent of the acetylenic compound may be used. The reaction is ordinarily and preferably carried out under ambient conditions.

The acetylenic compounds that may be used in the preparation of the novel complexes may be represented by the structural formula $$RC\equiv CH$$

wherein R represents hydrogen, vinyl, ethynyl, or an alkyl group having from 1 to 10 carbon atoms. Acetylene is the preferred acetylenic compound and the one that is ordinarily used in the practice of this invention. Other acetylenic compounds that may be used include allylene, ethylacetylene, tertiary butylacetylene, dodecyne-1, vinylacetylene, diacetylene, and the like. If desired, mixtures of acetylenic compounds may be used.

The cuprous aluminum tetrachloride complex with which the acetylenic compound is contacted may be prepared by methods that are known in the art. For example, excess cuprous chloride may be added to anhydrous aluminum chloride in an aromatic hydrocarbon solvent, such as benzene, toluene, or xylene. After the removal of excess cuprous chloride and impurities from the reaction mixture by filtration or by settling and decantation, the solution of cuprous aluminum tetrachloride in the aromatic hydrocarbon may be used without further purification and without isolation of the metallic complex in the preparation of the products of this invention.

It has been found that solutions of the acetylenic compound-cuprous aluminum tetrachloride complexes in aromatic hydrocarbon solvents provide an excellent means for the storage and transportation of the acetylenic compounds. At ambient temperatures and at low partial pressures of acetylene, as much as three hundred times as much acetylene can be added to the cuprous aluminum tetrachloride complex in toluene as can be dissolved in the same amount of any of the well-known solvents for acetylene, such as acetone, methyl pyrrolidone, or dimethylformamide. In addition the solutions of the novel complexes are stable under ambient conditions, and they are not sensitive to shock. The acetylenic compound can be recovered substantially quantitatively by heating the solution to a temperature in the range of about 75° C. to 100° C.

The storage of acetylene and other acetylenic compounds in the form of acetylenic compound complexes in an aromatic hydrocarbon is much simpler, less hazardous, and less expensive than the commonly-used method in which acetylene is stored under pressure in large tanks.

A solution of the acetylenic compound complex in an aromatic hydrocarbon can be pumped through lines of moderate size to a storage area where it may be stored for periods ranging from about 1 hour to three days or more; the solution is then pumped to another location where the acetylenic compound is stripped from the complex by heating it at about 75° C. to 115° C., and preferably at about 80° C., using benzene, toluene, heptane, or another hydrocarbon vapor as the stripping agent. The stripping agent, the cuprous aluminum tetrachloride complex, and the aromatic hydrocarbon are recovered and reused.

In a preferred embodiment of the invention, the formation of the novel complexes provides an efficient and economical means of separating acetylenic compounds from mixtures of gases that contain at least 2 mole percent of the acetylenic compounds. In this procedure, a gas stream that contains an acetylenic compound is brought into contact with cuprous aluminum tetrachloride and preferably with a solution of the metallic chloride complex in an aromatic hydrocarbon, for example, by countercurrent absorption in a suitable column. The resulting solution of the acetylenic compound-cuprous aluminum tetrachloride complex is then stripped with hydrocarbon vapor to give a quantitative yield of a concentrated acetylenic compound.

In another preferred embodiment of the invention, a solution of the acetylenic compound-cuprous aluminum tetrachloride complex in an aromatic hydrocarbon is used as a medium in which reactions are carried out between the acetylenic compound and other compounds. For example, the reaction between diacetylene and an aromatic compound to form a tetraarylbutane may be carried out by adding the aromatic compound to a solution of the diacetylene-cuprous aluminum tetrachloride complex in toluene that contains a catalytic amount of $AlCl_3$ or $(Al_2Cl_7)^-$ anion. In this way reactions that otherwise would be difficult or hazardous to carry out may be readily and safely carried out. In addition stable organic compounds may be prepared in this way from acetylene and from unstable by-products of acetylene manufacture.

Extensive testing has shown that when acetylene is brought into contact with cuprous aluminum tetrachloride in an aromatic hydrocarbon, the acetylene-cuprous aluminum tetrachloride complexes that are formed are stable under ambient conditions and are not sensitive to shock. No side reactions occur that result in the formation of diacetylenes or acetylides that have explosive properties. The ease and safety with which solutions of the novel complexes can be handled is surprising since it is well known that under certain conditions acetylene reacts with copper to form explosive acetylides.

The invention is further illustrated by the examples that follow.

EXAMPLE 1

(A) Cuprous aluminum tetrachloride was prepared by the fusion of equivalent amounts of cuprous chloride and aluminum chloride. The cuprous aluminum tetrachloride complex formed was a solid that melted at 270° C.

(B) Acetylene gas was brought into contact with dry, solid cuprous aluminum tetrachloride at 25° C. The resulting acetylene-cuprous aluminum tetrachloride complex, which had the structural formula $C_2H_2:Cu(AlCl_4)$, was a solid that had an acetylene decomposition pressure of $22\pm2$ mm. Hg at 25° C. and $8\pm1$ mm. Hg at 0° C. When it was heated under vacuum, the complex decomposed quantitatively to gaseous acetylene and solid cuprous aluminum tetrachloride.

EXAMPLE 2

To one mole of anhydrous aluminum chloride in toluene was added 1.1 moles of cuprous chloride. The resulting solution was filtered to remove unreacted cuprous chloride and impurities. This solution contained 28.6 mole percent of cuprous aluminum tetrachloride and 71.4 mole percent of toluene.

This solution was contacted with acetylene at 25° C. to form a solution of an acetylene-cuprous aluminum tetrachloride complex that contained equimolar amounts of acetylene, cuprous chloride, and aluminum chloride.

The acetylene complex solution was stored at 20°–30° C. for several days. More than 97 percent of the acetylene was then recovered from the solution by stripping it with benzene vapor at 80° C. and cooling the recovered vapors to condense the benzene.

EXAMPLE 3

A cuprous aluminum tetrachloride solution in toluene, which was prepared by the procedure described in Example 2, was contacted with diacetylene at 25° C. The product obtained was a solution in toluene of a diacetylene-cuprous aluminum tetrachloride complex that contained equimolar amounts of diacetylene, cuprous chloride, and aluminum chloride.

EXAMPLE 4

A cuprous aluminum tetrachloride solution in toluene, which was prepared by the procedure described in Example 2, was contacted with vinyl-acetylene at 25° C. The product obtained was a solution in toluene of a vinylacetylene-cuprous aluminum tetrachloride complex that contained equimolar amounts of vinylacetylene, cuprous chloride, and aluminum chloride.

EXAMPLE 5

Figure 2:
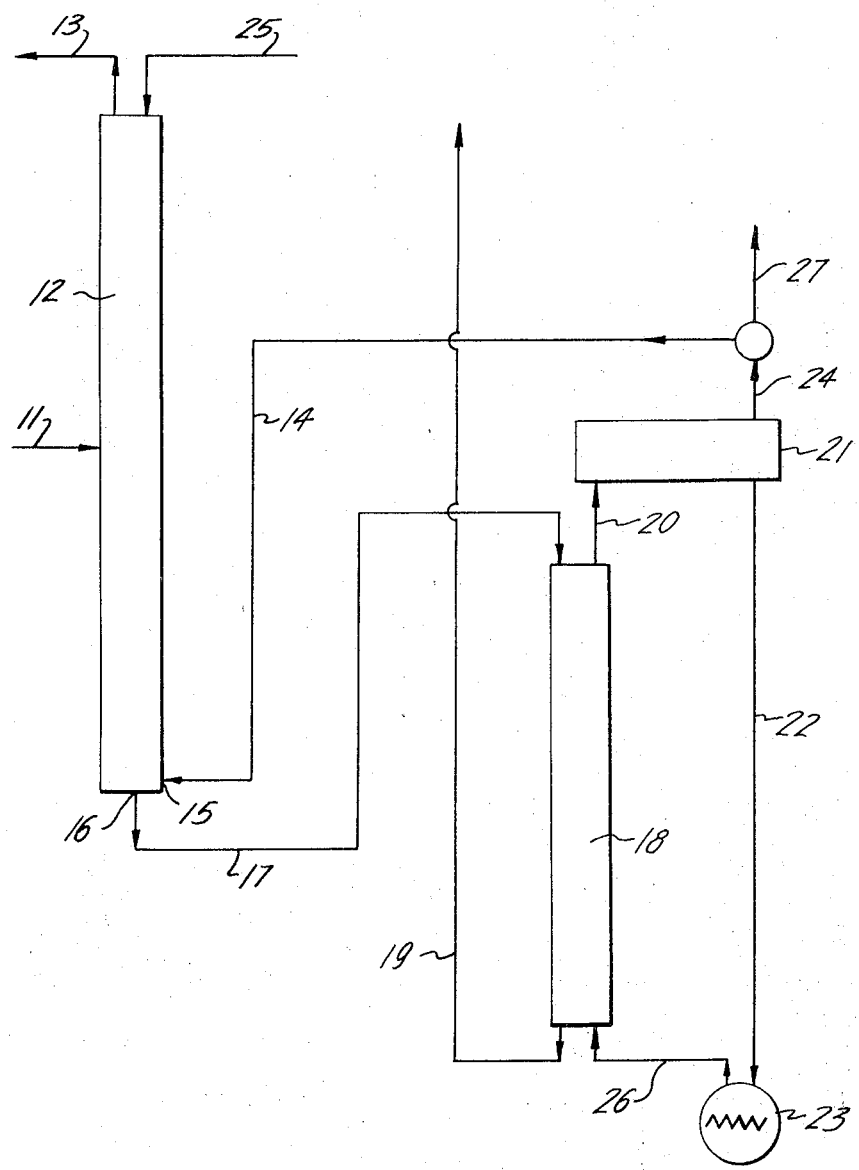

The apparatus schematically shown in FIG. 2 may be used to separate acetylene from a gas mixture obtained by the pyrolysis of natural gas by the process of this invention.

This gas has the following composition:

|  | Mm. |
|---|---|
| Hydrogen | 560 |
| Carbon monoxide | 280 |
| Acetylene | 75 |
| Methane | 60 |
| Carbon dioxide | 25 |

In this process, the pyrolysis gas at ambient temperature and 19 p.s.i.a. pressure enters absorption column 12 through inlet 11. Upon entering the column, the gas is contacted with a solution that contains about 22 mole percent of cuprous aluminum tetrachloride and 78 mole percent of toluene that has entered the column through line 25. The amount of the solution fed to the column is at least that which contains sufficient cuprous aluminum tetrachloride to react with all of the acetylene in the pyrolysis gas. The acetylene in the gas is distributed between the gas phase and the liquid phase in a manner consistent with its solubility in the solvent at ambient temperature. The carbon monoxide present is also distributed between the gas and liquid phases. All of the other constituents of the pyrolysis gas are inert and, except for a small amount that is dissolved, remain in the gas phase.

As the gas ascends in column 17, acetylene is preferentially absorbed in the downgoing solution, and carbon dioxide preferentially remains in the upgoing gas phase. The gas leaving the column through outlet 13 has less than 5 mm. Hg partial pressure of acetylene. Near the bottom of the column the downgoing solvent is contacted with an upgoing gas stream provided by recycling a small part of the acetylene product which enters column 12 through line 14 and gas inlet 15. This gas stream strips carbon monoxide and all of the other gases from the solvent and brings them to gas outlet 13.

The acetylene-rich solution, which contains only traces of carbon monoxide and the other pyrolysis gas constituents, is pumped through outlet 16 and line 17 to solvent regeneration tower 18, where it flows down against an upcoming stream of toluene vapor that enters the tower through line 26. The toluene vapor strips acetylene from the solution and carries it from the tower 18.

The hot toluene solution upon reaching the bottom of tower 18 contains less than 0.05 mole of acetylene per mole of cuprous aluminum tetrachloride. This solution, which leaves tower 18 through line 19, is cooled and then returned to absorption column 12 through line 25.

The gas stream leaving solvent regeneration tower 18 flows through line 20 into condenser 21 where it is cooled to ambient temperature. The condensed toluene is returned through line 22 to reboiler 23.

The gas that leaves condenser 21 through line 24 is acetylene that is saturated with toluene. A small portion of this gas stream is recycled through line 14 to absorption column 12. After removal of the remaining toluene from it by cooling or other known techniques, the rest of the acetylene leaves the system through line 27.

By the use of this process, about 95 percent or more of the acetylene in pyrolysis gas can be recovered as substantially pure acetylene.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

We claim:
1. A compound that has the structural formula

RC=CH:Cu(AlCl₄)

wherein R represents hydrogen, vinyl, ethynyl, or an alkyl group having from 1 to 10 carbon atoms.

2. The compound as set forth in claim 1 wherein R represents hydrogen.
3. The compound as set forth in claim 1 wherein R represents ethynyl.
4. The compound as set forth in claim 1 wherein R represents vinyl.
5. A composition of matter that is a solution that contains about 25 percent to 75 percent by weight of a compound that has the structural formula RC≡CH:Cu(AlCl₄)

wherein R represents hydrogen, vinyl, ethynyl, or an alkyl group having from 1 to 10 carbon atoms in an aromatic hydrocarbon.

6. A composition of matter that is a solution containing about 25 percent to 75 percent by weight of an acetylene-cuprous aluminum tetrachloride complex in toluene.

7. A composition of matter that is a solution containing about 65 percent to 75 percent by weight of acetylene-cuprous aluminum tetrachloride complex in toluene.

8. A process for the production of a solution that contains about 25 percent to 75 percent by weight of a compound that has the structural formula RC≡CH:Cu(AlCl₄)

wherein R represents hydrogen, vinyl, ethynyl, or an alkyl group having from 1 to 10 carbon atoms in an aromatic hydrocarbon that comprises contacting a gas mixture that contains at least 2 mole percent of an acetylenic compound having the structural formula

RC≡CH wherein R has the aforementioned significance with a solution that contains about 25 percent to 70 percent by weight of cuprous aluminum tetrachloride in an aromatic hydrocarbon and separating the resulting solution of the acetylenic compound-cuprous aluminum tetrachloride complex from the gas mixture.

References Cited
UNITED STATES PATENTS

| 3,020,298 | 2/1962 | Ashby | 260—438.1 X |
| 3,420,862 | 1/1969 | Long | 260—438.1 |
| 3,538,134 | 11/1970 | Tedeschi et al. | 260—438.1 |

OTHER REFERENCES

Hardie, Acetylene Manufacture and Uses, Imperial Chemical Industries, Oxford Univ. Press, p. 51, 1965.

Mellor, Comprehensive Treatise on Inorganic and Theoretical Chemistry vol. 5, p. 322 (1924).

Dolgopol'skiy et al., Abstract from Thurnal Obshchey Khimii (1959), vol. 29, No. 8, pp. 2512–2517.

DELBERT E. GANTZ, Primary Examiner

H. M. S. SNEED, Assistant Examiner

U.S. Cl. X.R.

260—679 A

UNITED STATES PATENT OFFICE
CERTIFICATE OF CORRECTION

Patent No. 3,647,843          Dated March 7, 1972

Inventor(s) David G. Walker and Donald A. Keyworth

It is certified that error appears in the above-identified patent and that said Letters Patent are hereby corrected as shown below:

Column 1, line 29, change "are" second occurrence to -- arc --.

Column 5, line 35, replace the structural formula with the following formula:

$$RC{\equiv}CH:Cu(AlCl_4)$$

Column 6, line 42, change "Thurnal" to --Zhurnal --.

Signed and sealed this 8th day of August 1972.

(SEAL)
Attest:

EDWARD M. FLETCHER, JR.          ROBERT GOTTSCHALK
Attesting Officer                Commissioner of Patents